(12) United States Patent
Roy et al.

(10) Patent No.: US 11,675,583 B2
(45) Date of Patent: Jun. 13, 2023

(54) SYSTEM AND METHOD FOR CONTINUOUS DEVELOPMENT AND CONTINUOUS INTEGRATION FOR IDENTIFIED DEFECTS AND FIXES OF COMPUTING PRODUCTS

(71) Applicant: Dell Products L.P., Round Rock, TX (US)

(72) Inventors: Mainak Roy, Bangalore (IN); Rathi Babu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/342,572

(22) Filed: Jun. 9, 2021

(65) Prior Publication Data

US 2022/0398094 A1  Dec. 15, 2022

(51) Int. Cl.
*G06F 8/73* (2018.01)

(52) U.S. Cl.
CPC ...................... *G06F 8/73* (2013.01)

(58) Field of Classification Search
CPC ....................................................... G06F 8/73
See application file for complete search history.

(56) References Cited

U.S. PATENT DOCUMENTS

| 10,528,454 B1* | 1/2020 | Baraty | G06F 11/3684 |
| 2009/0210861 A1* | 8/2009 | Alupului | G06F 8/73 717/123 |
| 2013/0326336 A1* | 12/2013 | Lanque | G06F 40/143 715/234 |
| 2014/0282403 A1* | 9/2014 | Frenkiel | G06F 8/73 717/123 |
| 2015/0347128 A1* | 12/2015 | Frenkiel | G06F 8/36 717/123 |
| 2017/0177324 A1* | 6/2017 | Frank | G06F 9/44536 |
| 2021/0232391 A1* | 7/2021 | Wellinghoff | G06F 16/137 |
| 2022/0058338 A1* | 2/2022 | Hanson | G06F 40/205 |
| 2022/0121554 A1* | 4/2022 | Das | G06F 11/3668 |

* cited by examiner

*Primary Examiner* — Wei Y Zhen
*Assistant Examiner* — Amir Soltanzadeh
(74) *Attorney, Agent, or Firm* — Terrile, Cannatti & Chambers, LLP; Emmanuel A. Rivera

(57) ABSTRACT

A system, method, and computer-readable medium for providing documentation supporting continuous development and continuous integration for specific product lines is described. Source code from product development is received as to issues, such as bugs, defects, fixes and enhancements related to specific product lines. A determination is performed if the source code is complete or locked. Complete source code is converted to a standardized language. Another determination is performed as to whether the converted source code is compliant to a document standard. Compliant document standard source code can be consumed by an authoring environment for the documentation related to the specific product line.

20 Claims, 4 Drawing Sheets

SYSTEM AND METHOD FOR CONTINUOUS DEVELOPMENT AND CONTINUOUS INTEGRATION FOR IDENTIFIED DEFECTS AND FIXES OF COMPUTING PRODUCTS

BACKGROUND OF THE INVENTION

Field of the Invention

The present invention relates to the management of information handling systems. More specifically, embodiments of the invention provide a system, method, and computer-readable medium for continuous development and continuous integration for bugs, defects, enhancements, patches of computing products, and providing updated product documents.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information.

Computing or technology based companies may offer different computing products to various end user customers. Such products can have different variations. In other words, products can have different product lines that branch from the "main" product. In addition, other lines can branch from product lines.

Oftentimes, fixes are determined for bugs or defects that can occur in the products. The fixes can come in the form of an interim update patch or full enhancement to software, firmware or hardware of a computing product. Because of differing lines or variation of products, one branch or line of a product may require a fix, while another branch or line of the same product may not require the fix. Customers may be left on their own to determine if a patch, fix, or enhancement is needed for their particular product (i.e., product variation). Proper documentation is needed by the customers for their particular product.

In house technical personnel supporting the products are also affected varying branches or lines of a product(s), since such personnel may support different branches or lines of the product(s). A determination is needed as to the exact branch or version of a product to apply a fix. When fixes are applied, documentation should be updated and provided as to how a fix to a specific product will impact products that depend on that specific product.

Content developers typically are responsible for providing documentation to support products, and to support particular product lines. Developers may use different source code languages supporting fixes, updates, enhancements to products. Typical solutions involve manually entering fixes and changes into documentation, which can lead to potential errors or may not be timely entered to allow content developers and other personnel to timely incorporate changes to the products. Although bugs or defects may be determined or tracked, documentation may not be updated correctly or in a timely manner. There may be multiple developers supporting the same product (i.e., product variation). Timely and accurate documentation of bugs, defects, patches and fixes are needed to allow the developers to make changes and not to impact work of co-developers.

SUMMARY OF THE INVENTION

A system, method, and computer-readable medium for providing documentation supporting continuous development and continuous integration for specific product lines is described. Source code from product development is received as to issues, such as bugs, defects, fixes and enhancements related to specific product lines. A determination is performed if the source code is complete or locked. Complete source code is converted to a standardized language. Another determination is performed as to whether the converted source code is compliant to a document standard. Compliant document standard source code can be consumed by an authoring environment for the documentation related to the specific product line.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing continuous development and continuous integration to ensure product customers/users and product developers, that content and documentation are up to date for fixes and enhancements related to product bugs and defects. Specific product branches or lines are addressed (i.e., specific documentation provided for) and omittance of critical information in documents can be avoided when bugs/defects and fixes/enhancements are addressed and provided for.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

It is further to be understood that one or more information handling systems may be implemented, such as multiple server computing systems. In certain embodiments, cloud computing may be implemented, performing the methods described herein.

Figure 1:
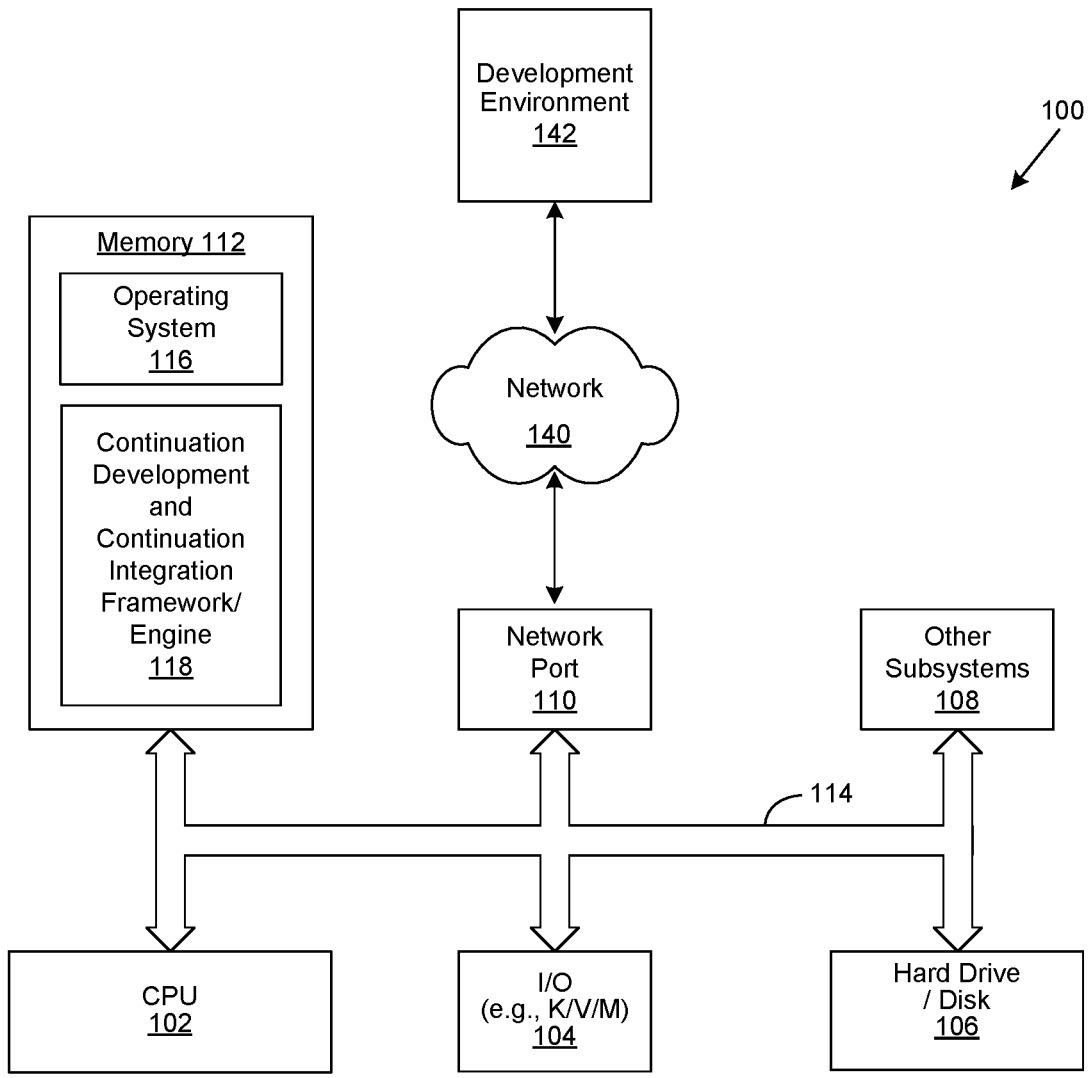
FIG. 1 is a general illustration of components of an information handling system as implemented in the system and method of the present invention.

FIG. 1 is a generalized illustration of an information handling system that can be used to implement the system and method of the present invention. The information handling system 100 includes processors (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a development environment 142. The network 140 may be a public network, such as the Internet, a physical private network, a wireless/wired network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes operating system (OS) 116. Certain embodiments provide for the information handling system 100 to be implemented as a server computer, computing device, stand-alone workstation, etc.

In various embodiments, the system memory 112 includes a continuous development and continuous integration framework or engine (CD and CI framework/engine) 118 further described herein.

Figure 2:
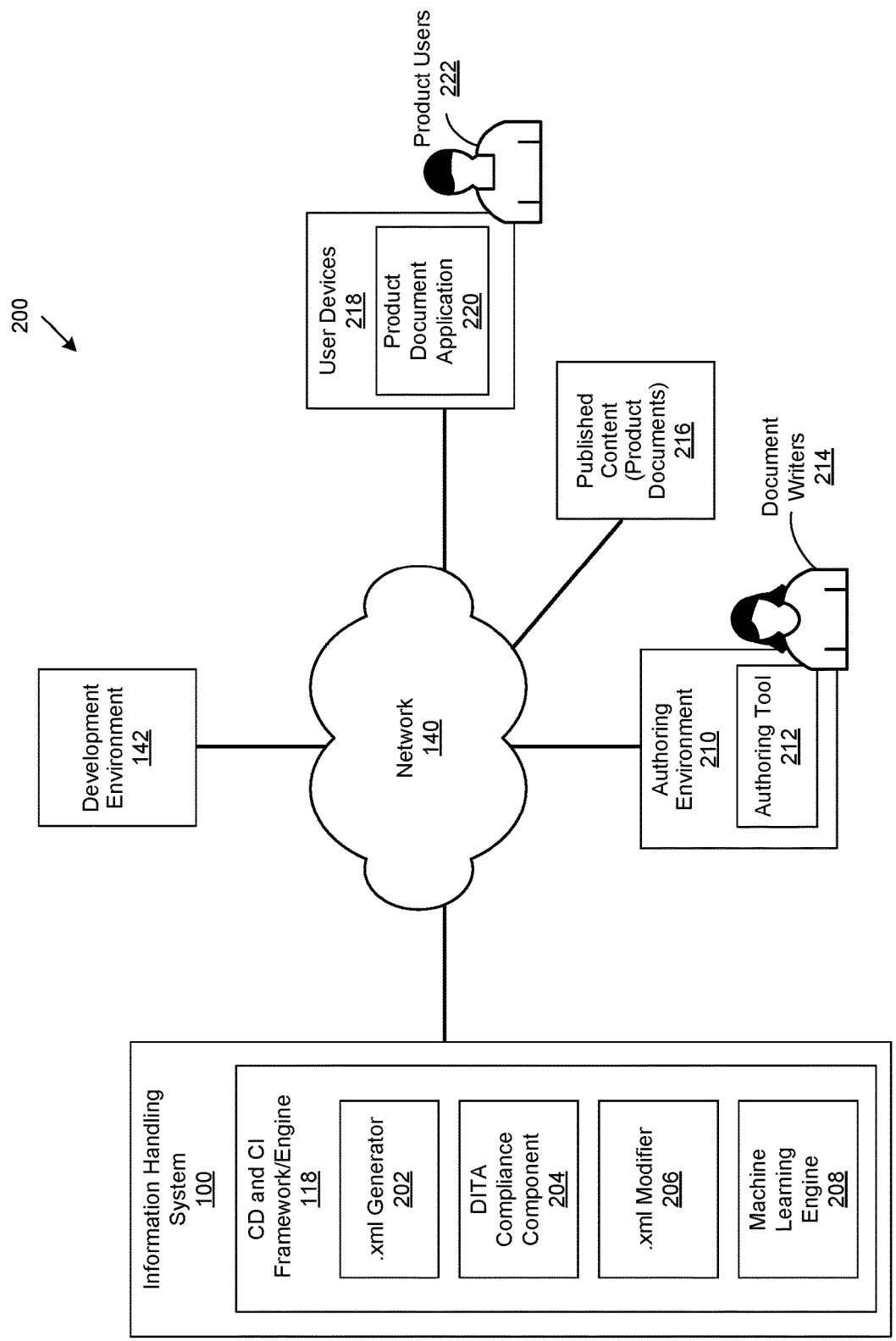
FIG. 2 is a simplified block diagram of a system for continuous development and continuous integration for bugs, defects, enhancements, patches of computing products, and providing updated product documents.

FIG. 2 is a simplified block diagram of a system for continuous development and continuous integration for bugs, defects, enhancements, patches of computing products, and providing updated product documents. The system 200 includes the information handling system 100. As discussed, certain embodiments, the information handling system 100 can be implemented using one or more systems, such as server computers. Embodiment also include the use of cloud computing.

As discussed, the information handling system 100 includes the CD and CI framework/engine 118. Various implementations provide for the CD and CI framework/engine 118 to include and implement an .xml generator 202, a DITA compliance component 204, an .xml modifier 206, and a machine learning engine 208.

Implementations provide for the .xml generator 202 to translate code supporting products (i.e., specific product line/branch), to .xml code. Such code written by developers of development environment 142, may be in different languages, such as Python, Java, etc. The code is converted to raw .xml files by the .xml generator 202.

DITA is Darwin Information Typing Architecture (DITA), which is a specification that defines a set of document types for authoring and organizing topic-oriented information, as well as a set of mechanisms for combining, extending, and constraining document types. In various implementations, the DITA compliance component 204 is used to provide standardized documentation format for product specific documents that are generated by the system 200. It is to be understood that DITA is one documentation standard and that other documentation standards can be implemented. The DITA compliance component 204 assures that DITA rules are correctly applied to the raw .xml files so that content developers can easily integrate the content with the right source.

The .xml modifier 206 implements changes to the .xml file to meet DITA compliance. In certain embodiments, the xml generator 202 and the .xml modifier 206 may be implemented as an .xml constructor.

The machine learning engine 208 implements a learning algorithm and mechanism that learns common .xml mismatches, errors, etc. that are found by DITA compliance component 204 to be avoided in the future. The learning algorithm of the machine learning engine 208 is implemented to understand the common mistakes that have may have occurred during the .xml conversion. The machine learning engine 208 can instruct the xml modifier 206/.xml constructor to avoid the similar mismatches, errors, etc. in future. Therefore, future processing by the .xml modifier 206/.xml constructor can improve usability and accuracy through the machine learning engine 208.

As discussed above, the information handling system 100 can be connected to the development environment 142 through the network 140. Certain implementations provide for the CD and CI framework/engine 118 to fetch application program interfaces (API) for communication, from the development environment 142. Implementations provide for communication through secure and dedicated API channels. API payloads from the development environment 142 can have information about the destination so that the information can be plugged/added to the right set of documentation folder. An API payload may also include information about the sources (all the branches that contributed to form this information). The information assists in back tracking and updating the content with any future fixes for the same set of defect/bug and fixes/enhancements.

Source code related to a product (i.e., specific product line/branch) is received from developers in development environment 142 by the CD and CI framework/engine 118. A specific identifier is given for the bug/defects and fixes/enhancements of the source code.

Embodiments further can provide for the system 200 to include an authoring environment 210 that receives DITA compliant .xml files from the CD and CI framework/engine 118. In particular, product identified DITA compliant .xml files are processed by an authoring tool 212 of the authoring environment 210. Document writers 214 access the authoring environment 210 and authoring tool 212 to create documents for products (i.e., specific product line/branch). The document writers 214 are able to integrate .xml source files with any required documentation.

Implementations provide for the created documents from authoring environment 210 to be stored in a repository or database as represented by published content (product documents) 216. Published content (product documents) 216 may be accessed by developers in development environment 142. The system 200 can also include user devices 218 that implement a product documentation application 220, which can accesses documents in published content (product documents) 216. A user device 218 can refer to an information handling system such as a personal computer, a laptop computer, a tablet computer, a personal digital assistant (PDA), a smart phone, a mobile telephone, or other device that is capable of communicating and processing data. User device 218 is accessible by product users 222. Product users 222 are customers that desire to have information and documentation that are related to their specific products (i.e., specific product line/branch).

In certain implementations, the product documentation application 220 can also be included in the development environment 142 and configured to start logging (firmware/software) logs that could be matched with the keywords of known issues to show that the issues may be due to existing ones. Also, dynamic data which is coming from an existing environment can be flagged and added. Dependent product can also be identified.

Figure 3:
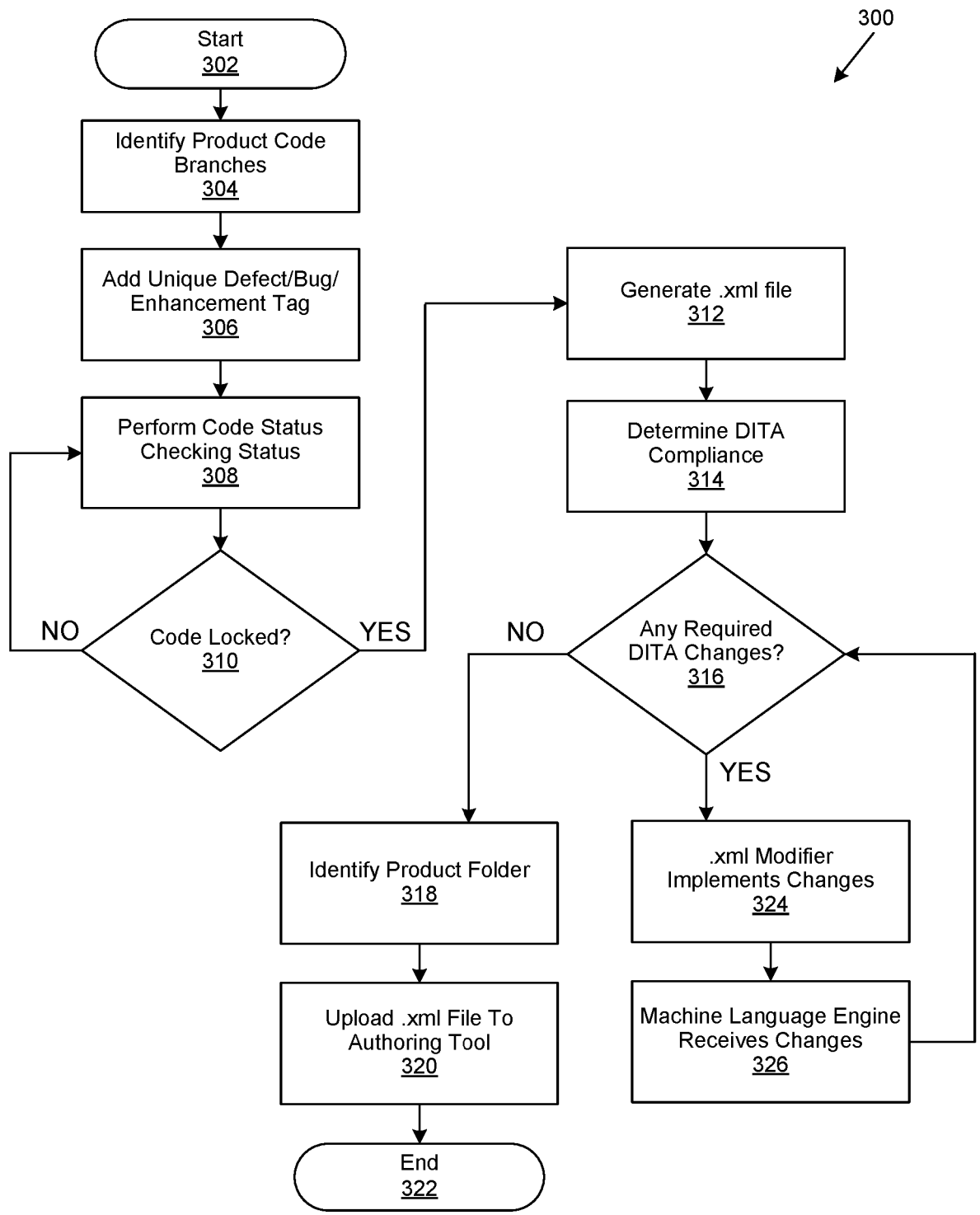
FIG. 3 is a generalized flowchart for continuous development and continuous integration for bugs, defects, enhancements, patches of computing products, and providing updated product documents.

FIG. 3 is a generalized flowchart for a continuous development and continuous integration for bugs, defects, enhancements, patches of computing products, and providing updated product documents. The order in which the method is described is not intended to be construed as a limitation, and any number of the described method blocks may be combined in an y order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 begins. At step 304, source code for specific product branches/lines are identified. The code may have specific identifiers or tracking IDs, such as those used for tool driven tracking. At step 306, a unique defect/bug/enhancement tag is created and assigned to the source code. Implementations provide for the CD and CI framework/engine 118 to generate and assign such tags. Implementations provide for creating a single ID after collecting sources from different branches of the same product.

At step 308, source code status checking is performed. At step 310, a determination is made if source code is locked. Once the tag is generated at step 306, for a defect/bug/enhancement, the CD and CI framework/engine 118 check status as to whether the source code is complete or locked, or incomplete (e.g., work in progress). This can be performed before collecting any source code, such that only data is collected from "closed" (i.e., complete or locked) product branches. This can allow the CD and CI framework/engine 118 to ensure that documentation is current whenever a defect is closed for a specific branch.

If source code is not locked, following the "NO" branch of step 310, step 308 is performed. If source code is locked, following the "YES" branch of step 310 at step 312, source code is converted to an .xml file. The source code that is received may be in written in one of different programming languages, such as Java, Python, etc. The source code is converted to a common language, such as a .xml. it is to be understood that other languages may be used instead of .xml. Implementations provide for the .xml generator 202 or .xml constructor to generate the .xml file from source code.

At step 314, determination is performed as to DITA compliance. Implementations provide for the DITA compliance component 204 to perform this step. Authoring tool 212 will accept DITA compliant .xml files. As discussed, DITA is aa documentation standard, and provides a standardized architecture in the technical documentation domain. It is to be understood that other documentation standards can be implemented.

At step 316, a determination is performed to determine if any DITA changes to the .xml are needed. If no changes are needed, following the "NO" branch of step 316, at step 318, a product folder of the source code is identified. As discussed, API payloads from the development environment 142 can have information about the destination so that the information can be plugged/added to the right set of documentation folder. Implementations provide that if the .xml file passes DITA compliance and can be uploaded, the CD and CI framework/engine 118 identifies a target product folder by considering the product identifier. The product identifier can include a "name," "version" and "release date."

At the step 320, the compliant .xml source file is uploaded to be integrated with required documentation. Implementations provide for the compliant .xml source file to be uploaded authoring environment 210 and authoring tool 212. At step 322, the process 300 ends.

If the .xml file does not pass DITA compliance, and any DITA standard changes are determined, such as by the DITA compliance component 204, following the "YES" branch of step 316, at step 324, changes are made to the .xml file. Implementations provide for the .xml modifier 206 or .xml constructor to perform the changes to assure DITA compliance.

At step 326, machine learning is performed to understand the changes that were made as to the .xml file for DITA compliance. As discussed, a learning algorithm and mechanism can be implemented that learns common .xml mismatches, errors, etc. that are found by DITA compliance component 204 to be avoided in the future. The learning algorithm of the machine learning engine 208 is implemented to understand the common mistakes that have may have occurred during the .xml conversion. The machine learning engine 208 can instruct the xml modifier 206/.xml constructor to avoid the similar mismatches, errors, etc. in future. Therefore, future processing by the .xml modifier 206/.xml constructor can improve usability and accuracy through the machine learning engine 208. The process 300 continues at step 316, performing a determination if the .xml file is DITA compliant.

Figure 4:
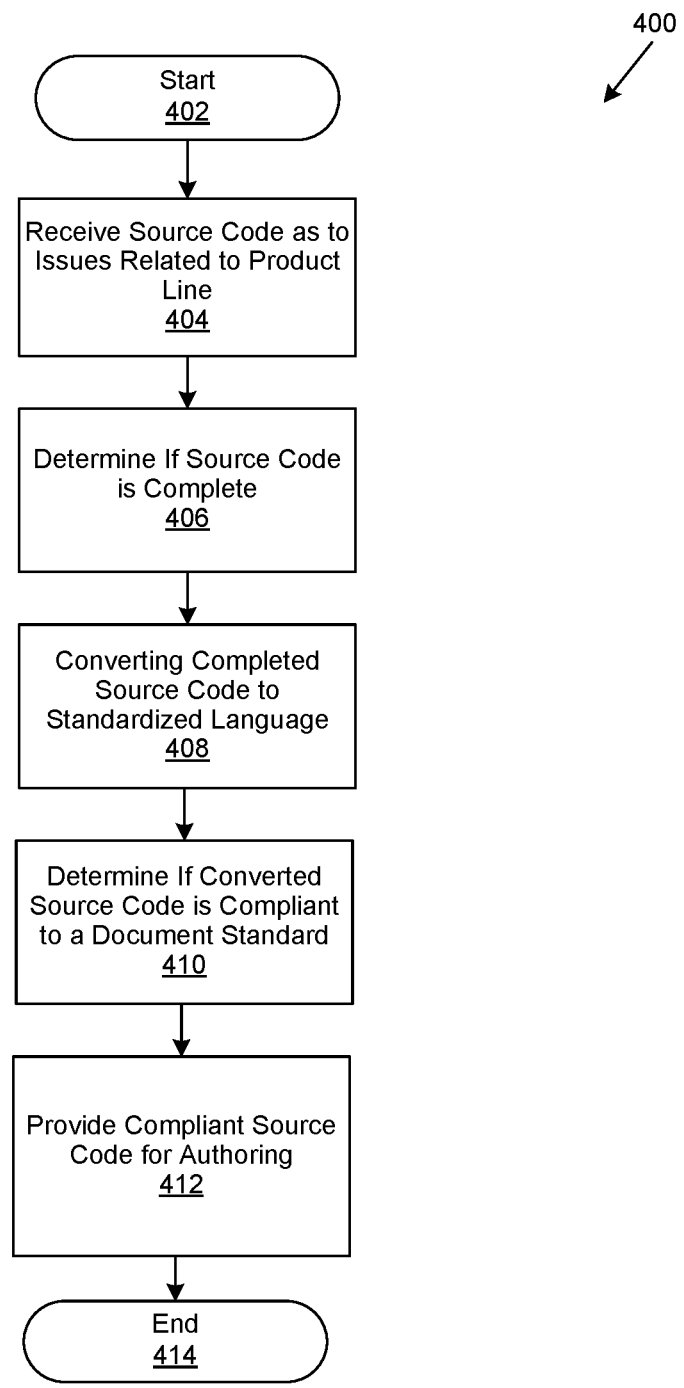
FIG. 4 is a generalized flowchart for providing documentation for specific product lines, as related to issues such as bugs, defects, fixes and enhancements.

FIG. 4 is a generalized flowchart for providing documentation for specific product lines, as related to issues such as bugs, defects, fixes and enhancements. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 begins. At step 404, source code is received as to issues related to a specific product line. As discussed, products can have a have different variations, lines or branches. Issues as to the specific product line can include bugs, defects, fixes and enhancements.

At step 406, determining is performed as to whether the source code is complete or locked. As discussed, source code may still be incomplete or a work in process.

At step 408, completed source code is converted to a standardized language. The received source code may be in particular language, such as Python, Java, etc. Since received source code can be in different languages, the received source code is converted to a standardize language, such as .xml.

At step 410, determining is performed as to whether the converted source code is compliant to a document standard.

DITA is an example of a document standard, although other document standards may be implemented. Non-compliant source code is further modified, until the source code is compliant. Certain implementations provide for machine learning to use information in the modifying of the source code for compliance for future source file modifications.

At step 412, document standard compliant source code is sent for authoring to documents supporting the specific product line. Implementations provide for the compliant source code to authoring environment 208. At step 414, the process 400 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method to provide product documentation for a specific product line comprising:
   receiving source code as to issues related to the specific product line;
   determining if the source code is complete;
   converting the completed source code to a standardized language;
   determining if the converted standardized source code is compliant to a document standard and can be uploaded to a machine learning engine;
   uploading if determined to be compliant, the converted standardized source code to a folder identified by a continuous development and continuous integration framework or engine;
   implementing a learning algorithm through the machine learning engine that learns common mismatches and/or errors from the determining, to avoid the common mismatches and/or errors in future source code conversions;
   providing document standard compliant source code for authoring into the product documentation for the specific product line; and
   providing logs as to firmware or software issues used to match keywords of known issues to show that the firmware or software issues are due to existing issues.

2. The method of claim 1, wherein the issues are related to bugs, defects, fixes and enhancements to the specific product line.

3. The method of claim 1 further comprising assigning a unique identifier to the received source code.

4. The method of claim 1, wherein the standardized language is Extensible Markup Language (.xml).

5. The method of claim 1, wherein the document standard is Darwin Information Typing Architecture (DITA).

6. The method of claim 1 further comprising performing machine learning in instances when the converted standardized source code is not compliant to the document standard and is modified to be compliant.

7. The method of claim 1 further comprising assigning the document standard compliant source code to a specific product folder.

8. A system comprising:
a processor;
a data bus coupled to the processor; and
a non-transitory, computer-readable storage medium embodying computer program code, the non-transitory, computer-readable storage medium being coupled to the data bus, the computer program code to provide product documentation for a specific product line, interacting with a plurality of computer operations comprising instructions executable by the processor and configured for:
receiving source code as to issues related to the specific product line;
determining if the source code is complete;
converting the completed source code to a standardized language;
determining if the converted standardized source code is compliant to a document standard and can be uploaded to a machine learning engine;
uploading if determined to be compliant, the converted standardized source code to a folder identified by a continuous development and continuous integration framework or engine;
implementing a learning algorithm through the machine learning engine that learns common mismatches and/or errors from the determining, to avoid the common mismatches and/or errors in future source code conversions;
providing document standard compliant source code for authoring into the product documentation for the specific product line; and
providing logs as to firmware or software issues used to match keywords of known issues to show that the firmware or software issues are due to existing issues.

9. The system of claim 8, wherein the issues are related to bugs, defects, fixes and enhancements to the specific product line.

10. The system of claim 8 further comprising assigning a unique identifier to the received source code.

11. The system of claim 8, wherein the standardized language is Extensible Markup Language (.xml).

12. The system of claim 8, wherein the document standard is Darwin Information Typing Architecture (DITA).

13. The system of claim 8 further comprising performing machine learning in instances when the converted standardized source code is not compliant to the document standard and is modified to be compliant.

14. The system of claim 8 further comprising assigning the document standard compliant source code to a specific product folder.

15. A non-transitory, computer-readable storage medium embodying computer program code, the computer program code comprising computer executable instructions configured for:
receiving source code as to issues related to the specific product line;
determining if the source code is complete;
converting the completed source code to a standardized language;
determining if the converted standardized source code is compliant to a document standard and can be uploaded to a machine learning engine;
uploading if determined to be compliant, the converted standardized source code to a folder identified by a continuous development and continuous integration framework or engine;
implementing a learning algorithm through the machine learning engine that learns common mismatches and/or errors from the determining, to avoid the common mismatches and/or errors in future source code conversions;
providing document standard compliant source code for authoring into the product documentation for the specific product line; and
providing logs as to firmware or software issues used to match keywords of known issues to show that the firmware or software issues are due to existing issues.

16. The non-transitory, computer-readable storage medium of claim 15, wherein the issues are related to bugs, defects, fixes and enhancements to the specific product line.

17. The non-transitory, computer-readable storage medium of claim 15 further comprising assigning a unique identifier to the received source code.

18. The non-transitory, computer-readable storage medium of claim 15, wherein the document standard is Darwin Information Typing Architecture (DITA).

19. The non-transitory, computer-readable storage medium of claim 15 further comprising performing machine learning in instances when the converted standardized source code is not compliant to the document standard and is modified to be compliant.

20. The non-transitory, computer-readable storage medium of claim 15 further comprising assigning the document standard compliant source code to a specific product folder.

* * * * *